United States Patent [19]

Wakatsuki et al.

[11] Patent Number: 4,897,857
[45] Date of Patent: Jan. 30, 1990

[54] FSK DEMODULATING DEVICE

[75] Inventors: Yoshio Wakatsuki; Hajime Takeuchi; Giichiro Shimizu, all of Tokyo, Japan

[73] Assignee: Man Design Co., Ltd., Tokyo, Japan

[21] Appl. No.: 234,734

[22] Filed: Aug. 22, 1988

[30] Foreign Application Priority Data

Sep. 9, 1987 [JP] Japan .................. 62-225525

[51] Int. Cl.$^4$ .................... H04L 27/14
[52] U.S. Cl. .................... 375/88; 375/80; 307/358; 329/300
[58] Field of Search .............. 375/99, 88, 45, 51, 375/76, 104, 80, 82, 94, 91, 116, 117; 307/358; 329/110

[56] References Cited

U.S. PATENT DOCUMENTS

| | | | |
|---|---|---|---|
| 3,509,279 | 4/1970 | Martin et al. | 375/76 |
| 3,688,205 | 8/1972 | Burger | 375/76 |
| 4,596,022 | 6/1986 | Stoner | 375/88 |

Primary Examiner—Robert L. Griffin
Assistant Examiner—Marianne Huseman
Attorney, Agent, or Firm—Nixon & Vanderhye

[57] ABSTRACT

An FSK shift keying device includes a detector for detecting a transmission frame consisting of a preamble, data, and a postamble, a leading edge detector for detecting a leading edge of a voltage signal detected by the detector, a microprocessor for receiving a detection signal output from the leading edge detector as an interrupt signal, and resetting and restarting a timer, the timer for counting a time lapse in accordance with a clock signal from a clock generator, a sample and hold circuit for holding the voltage signal output from the detector when the time lapse counted by the timer reaches a duration of the preamble, a reference voltage generator for generating a reference voltage signal having an amplitude value which is ½ an amplitude value of the voltage signal from the detector, and a comparator for comparing the reference voltage signal with the voltage signal from the sample and hold circuit.

7 Claims, 5 Drawing Sheets

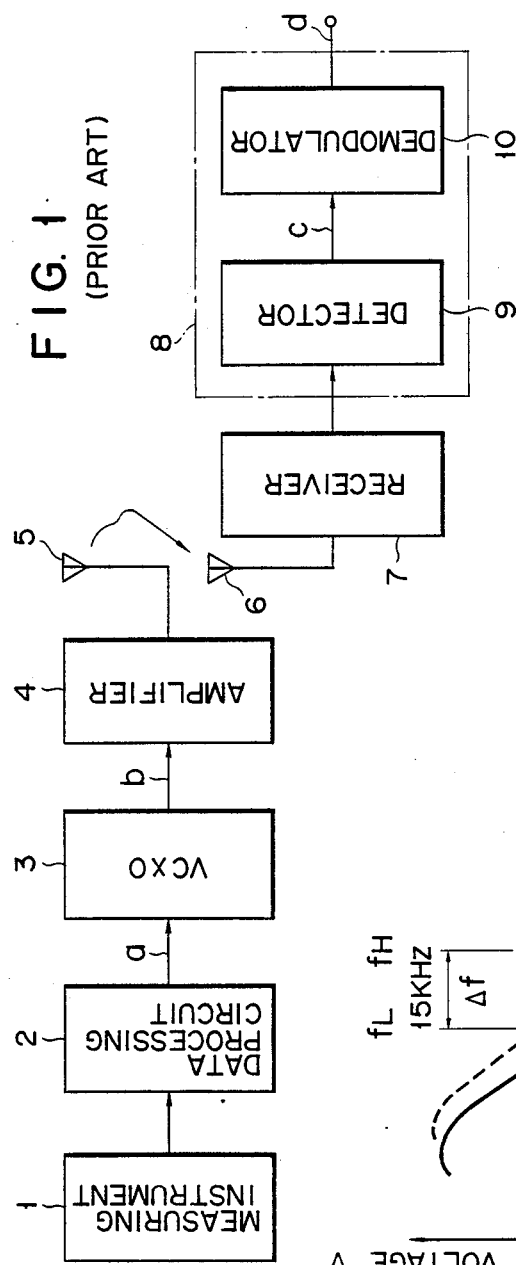
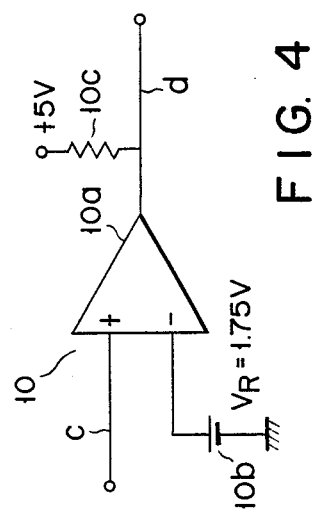
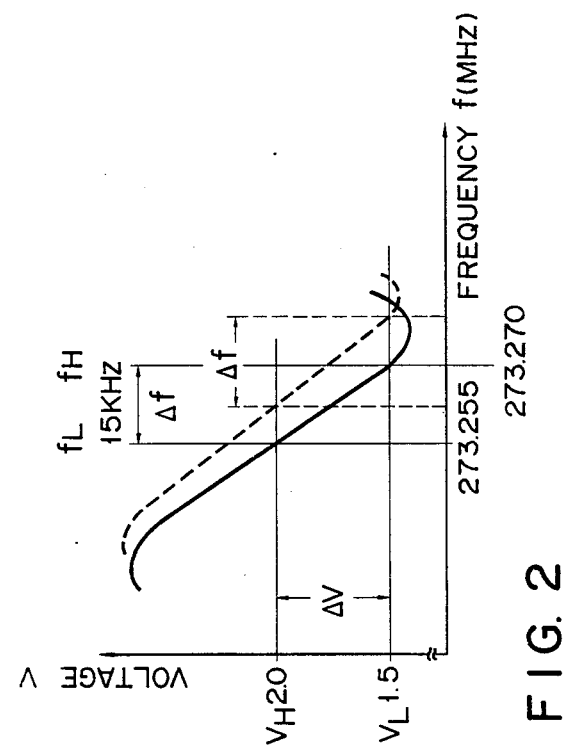

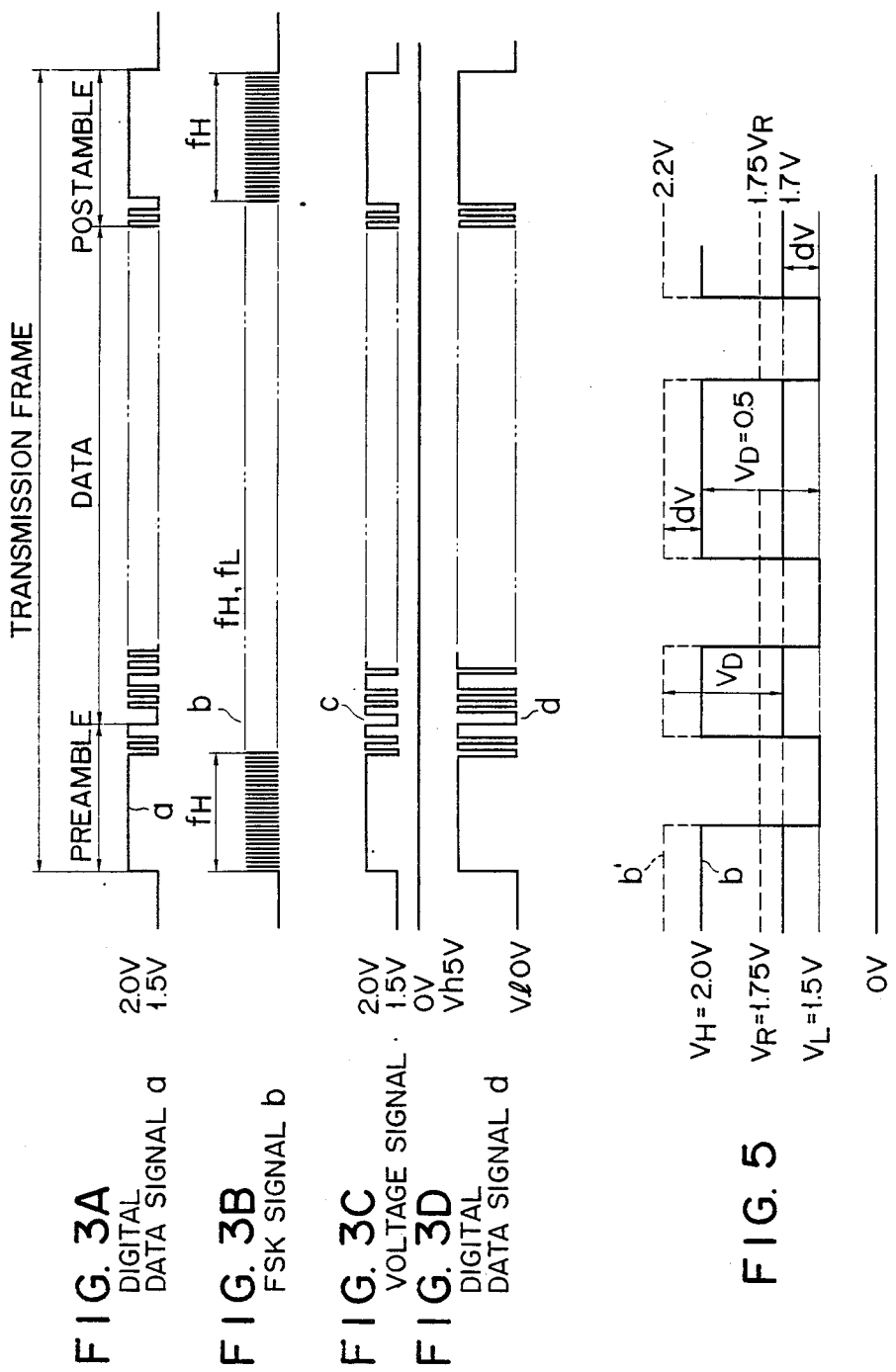

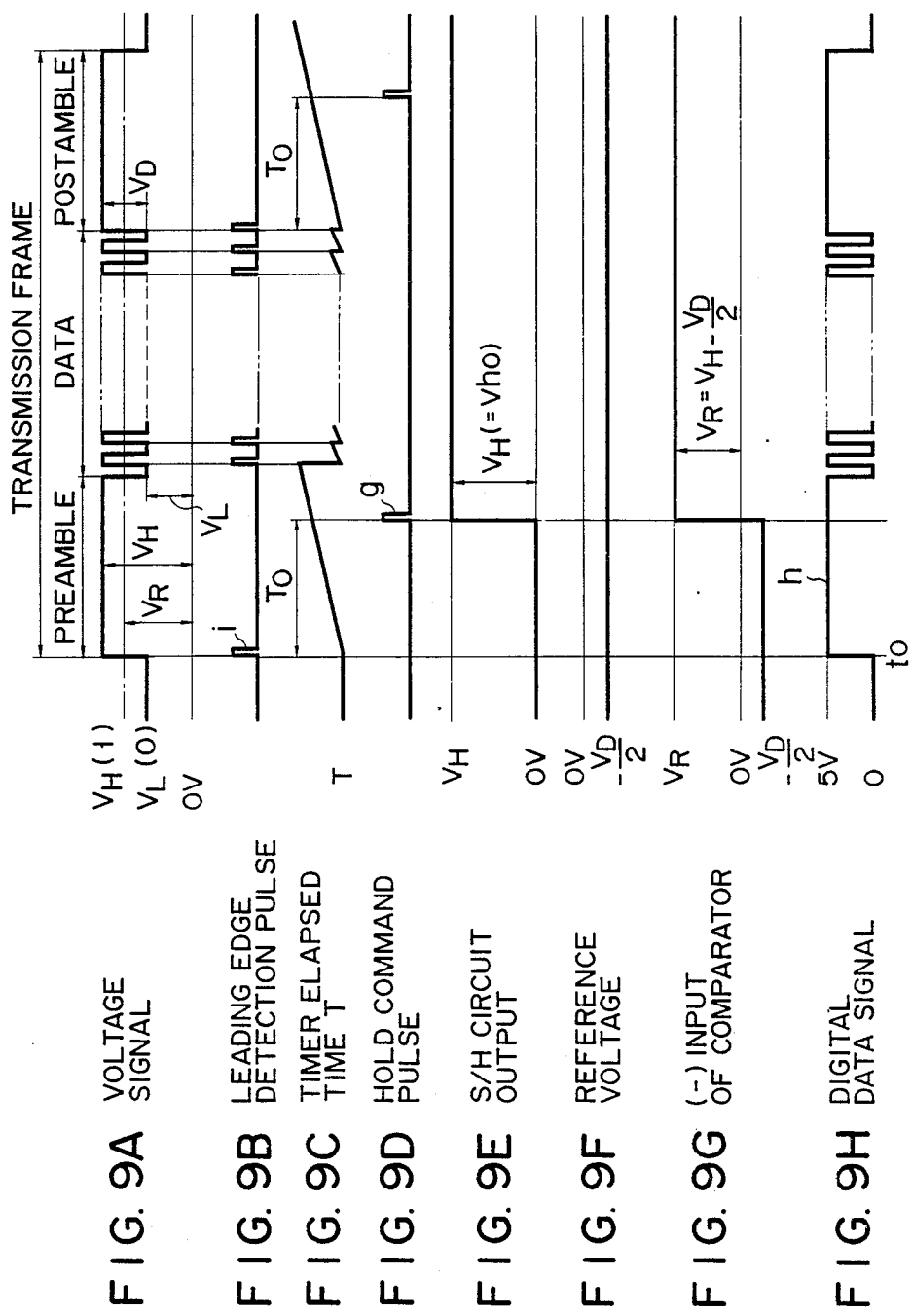

FSK DEMODULATING DEVICE

BACKGROUND OF THE INVENTION

1. Field of the Invention

The present invention relates to an FSK demodulating device located at a receiving side in a data transmission system in which digital data is formatted in a transmission frame to transmit the digital data as a frequency shift keying (FSK) signal, for demodulating the received frequency shift keying (FSK) signal to an original digital data signal.

2. Description of the Related Art

A data transmission system in which digital data is formatted in a transmission frame to transmit the digital data as a frequency shift keying (FSK) signal has been practically used as a means for accurately transmitting the digital data through a data communication channel or a radio channel for a long distance. FIG. 1 is a block diagram showing e.g., a data transmission system for transmitting data obtained by a measuring instrument to a host device through a radio channel.

The data measured by measuring instrument 1 is converted into e.g., 8-bit digital data by data processing circuit 2. The 8-bit digital data is formatted in a serial transmission frame and applied to voltage-controlled oscillator (VCXO) 3 as digital data signal a. Digital data signal a is modulated to frequency shift keying (FSK) signal b by voltage-controlled oscillator 3. Modulated signal b is amplified by amplifier 4 and output through a radio channel via antenna 5.

Frequency shift keying signal b output through the radio channel from antenna 5 is received by antenna 6 at a receiving side. Received signal b is amplified by amplifier 7 and unnecessary frequency components thereof are removed. Then, signal b is input to FSK demodulating device 8. Frequency shift keying signal b input to FSK demodulating device 8 is converted into voltage signal c by detector 9 and discriminated to obtain the original digital data signal d by demodulator 10.

Voltage-controlled oscillator 3 described above serves as e.g., an oscillator in which quartz is used as an oscillating element. As shown in FIG. 2, oscillation frequency f of oscillator 3 is changed in proportion to input voltage value V. As shown in FIG. 3A, assume that when digital data signal a is at H level, its signal value is e.g., 2.0 V, and when signal a is at L level, its signal value is e.g., 1.5 V. When digital data signal a is kept at H level (V=VH), signal a serves as an output signal having frequency fH (=273.270 MHz). When digital data signal a is kept at L level, signal a serves as an output signal having frequency fL (=273.252 MHz). More specifically, frequency shift keying (FSK) signal b output from voltage-controlled oscillator 3 serves as a combination signal consisting of frequencies fH and fL which are respectively output in response to the H and L signal levels.

Detector 9 at a receiving side converts frequency shift keying signal b received by receiver 7 into voltage values VH (=2.0 V) and VL (=1.5 V) in correspondence with frequencies fH and fL of signal b and outputs voltage signal c, as shown in FIG. 3C.

As shown in FIG. 4, discriminator 10 includes voltage comparator 10a and pull-up resistor 10c. In voltage comparator 10a, voltage signal c is input to a (+) input terminal thereof, and e.g., reference voltage VR of 1.75 V from battery 10b is applied to a (−) terminal thereof. Pull-up resistor 10c is arranged to apply a control voltage of +5 V to an output terminal of voltage comparator 10a. Therefore, input voltage signal c is compared with reference voltage VR (=1.75 V), and digital data signal d (Vh=5 V, and Vl=0 V) is output from the output terminal, as shown in FIG. 3D.

The FSK demodulating device with the above arrangement, however, has the following problems. More specifically, a conventional FSK signal has two transmission methods. One of them is called subcarrier FSK or audio FSK. In this method, FM modulation of binary signal is performed with two audio frequencies. The other method is called direct FSK. In this method, as shown in FIGS. 1 and 2, a carrier itself is shifted to modulate the binary signal.

The direct FSK has the following advantages as compared to the subcarrier FSK or the audio FSK. That is, in the direct FSK, a higher transmission speed and a simple modulating device can be realized at low manufacturing cost. However, the direct FSK has the following disadvantage in its demodulator. More specifically, according to the conventional method, a signal modulated with the direct FSK is demodulated to the voltage corresponding to the binary value through an FM demodulating device. At this time, if the frequency of the carrier is changed in accordance with the change in factors such as temperature, voltage, and the like, which affect the frequency, the voltage which is FM-demodulated is also changed. Therefore, the voltage comparator cannot accurately compare the voltages. The above arrangement will be described below in detail with reference to the accompanying circuit diagrams.

Voltage-controlled oscillator 3 at a transmitting side as described above has a quartz oscillating element. Therefore, as shown in FIG. 2, output frequency change Δf (=fH−fL) with respect to input voltage change ΔV (=VH−VL) is hardly changed and a predetermined value is constantly maintained. For example, Δf=15 kHz at ΔV=0.5 V, according to the arrangement in FIG. 2.

If an ambient temperature is changed, however, entire voltage frequency characteristics are shifted, as represented by a dotted line in FIG. 2. In other words, the characteristics are zero-point shifted in an axis direction of frequency f. Thus, if the voltage frequency characteristics are zero-point shifted, frequency values fH and fL of frequency shift keying signal b are equally increased from the corresponding reference values (273.270 MHz, 273,255 MHz).

Detector 9 in FSK demodulating device 8 at the receiving side, which has received frequency shift keying signal b including above frequencies fH and fL, detects frequencies fH and fL which are equally increased. Therefore, as shown in FIG. 5, voltages VH and VL of voltage signal b' output from detector 9 have signal waveforms zero-point shifted upward by dV as compared to voltages VH and VL of voltage signal b in a normal mode.

When voltage signal b' zero-point shifted by dV is applied to the (+) terminal of voltage comparator 10a in discriminator 10, since the value of reference voltage VR applied to the (−) terminal is not changed, reference voltage VR and voltage VL of voltage signal b' become similar to each other. Therefore, is some noise or the like is mixed in voltage signal b', discriminator 10 may be erroneously operated. In addition, when zero-point shift amount dV described above becomes larger than reference voltage VR, this discriminator 10 cannot undesirably demodulate voltage signal b' to original data signal d.

It should be noted that even if the above-described voltage frequency characteristics are zero-point shifted in a (−) direction, or digital data signal a input to voltage-controlled oscillator 3 is largely zero-point shifted, oscillation frequencies fH and fL of voltage-controlled oscillator 3 are shifted to pose the above problems.

SUMMARY OF THE INVENTION

It is an object of the present invention to provide an FSK demodulating device which can always demodulate an accurate digital data signal from a frequency shift keying signal even if a detected voltage signal is largely zero-point shifted, and can greatly improve reliability of the device.

In order to achieve the above object, according to the present invention, there is provided an FSK demodulating device for causing a detector to convert an input frequency shift keying (FSK) signal into a voltage signal corresponding to each carrier frequency value, and causing a discriminator to discriminate the converted voltage signal to obtain the original digital data signal representing a transmission frame including a preamble and data, wherein the discriminator comprises a sample and hold circuit for holding a signal value of the voltage signal in response to a hold command signal applied to a control terminal; a timer for counting a time lapse from a given change to the next change in a signal value of the voltage signal in a voltage increase direction; a sample and hold circuit control circuit for transmitting the hold command signal to the sample and hold circuit when the time lapse counted by the timer reaches predetermined time set in correspondence with a duration of "1" (H level) in the preamble of the transmission frame; a reference voltage circuit for outputting a reference voltage which is ½ an amplitude value of the voltage signal; and a voltage comparator, one input terminal of which receives the voltage signal and the other input terminal of which receives a comparison voltage obtained by subtracting the reference voltage of the reference voltage circuit from the holding voltage of the sample and hold circuit.

According to the FSK demodulating device of the present invention, the voltage signal output from the detector is input to the voltage comparator and the sample and hold circuit. Note that "1" (H level) state which is a predetermined or longer duration continues in the preamble generally set at a leading portion of the transmission frame. Therefore, the duration from a given change to the next change in a signal value of the voltage signal in the voltage increase direction is counted, so that the preamble can be specified. The signal value at this time (H level value corresponding to "1") is held by the sample and hold circuit. On the other hand, even if zero-point shift occurs, amplitude value VD represented by a difference between voltages VH and VL of the voltage signal is kept substantially constant. Therefore, if a difference voltage obtained by subtracting the reference voltage of the ½ amplitude value from the holding voltage of the sample and hold circuit is applied as a comparison voltage in a case where the voltage signal is demodulated to the digital data signal, the comparison voltage is changed in response to the zero-point shift of the voltage signal. Therefore, the comparison voltage value is always given as an intermediate value between voltage values VH and VL of the voltage signal, thus preventing the comparison voltage value from coming close to voltage VH or VL. Therefore, an accurate digital data signal can be obtained from the output terminal of the voltage comparator.

Therefore, even if the detected voltage signal is largely zero-point shifted, an accurate data signal can always be demodulated in response to the frequency shift keying (FSK) signal, thereby greatly improving reliability of the device.

BRIEF DESCRIPTION OF THE DRAWINGS

Other objects and features of the present invention will be apparent from the following description taken in connection with the accompanying drawings, in which:

FIG. 1 is a block diagram showing a conventional data transmission system;

FIG. 2 is a graph showing voltage frequency characteristics of a conventional voltage-controlled oscillator;

FIGS. 3A through 3D are timing charts of signals used in the data transmission system shown in FIG. 1, in which FIG. 3A is a timing chart of digital data signal a, FIG. 3B is a timing chart of an FSK signal, FIG. 3C is a timing chart of voltage signal c, and FIG. 3D is a timing chart of digital data signal d;

FIG. 4 is a circuit diagram of a demodulator shown in FIG. 1;

FIG. 5 is a chart of a waveform of voltage signal b' output from a detector shown in FIG. 1;

FIGS. 9A through 9H are timing charts of the signals used in the FSK demodulating device according to the present invention shown in FIG. 6, in which FIG. 9A shows voltage signal e output from the detector, FIG. 9B shows a leading edge detection pulse output from a leading edge detector, FIG. 9C shows an output signal output from a timer, FIG. 9D shows a hold command pulse g output from the microprocessor, FIG. 9E shows an output signal output from the sample and hold circuit, FIG. 9F shows a reference voltage signal generated by a reference voltage generator, FIG. 9G shows a voltage signal to be input to a comparator, and FIG. 9H shows digital data signal h.

DETAILED DESCRIPTION OF THE PREFERRED EMBODIMENT

Figure 6:
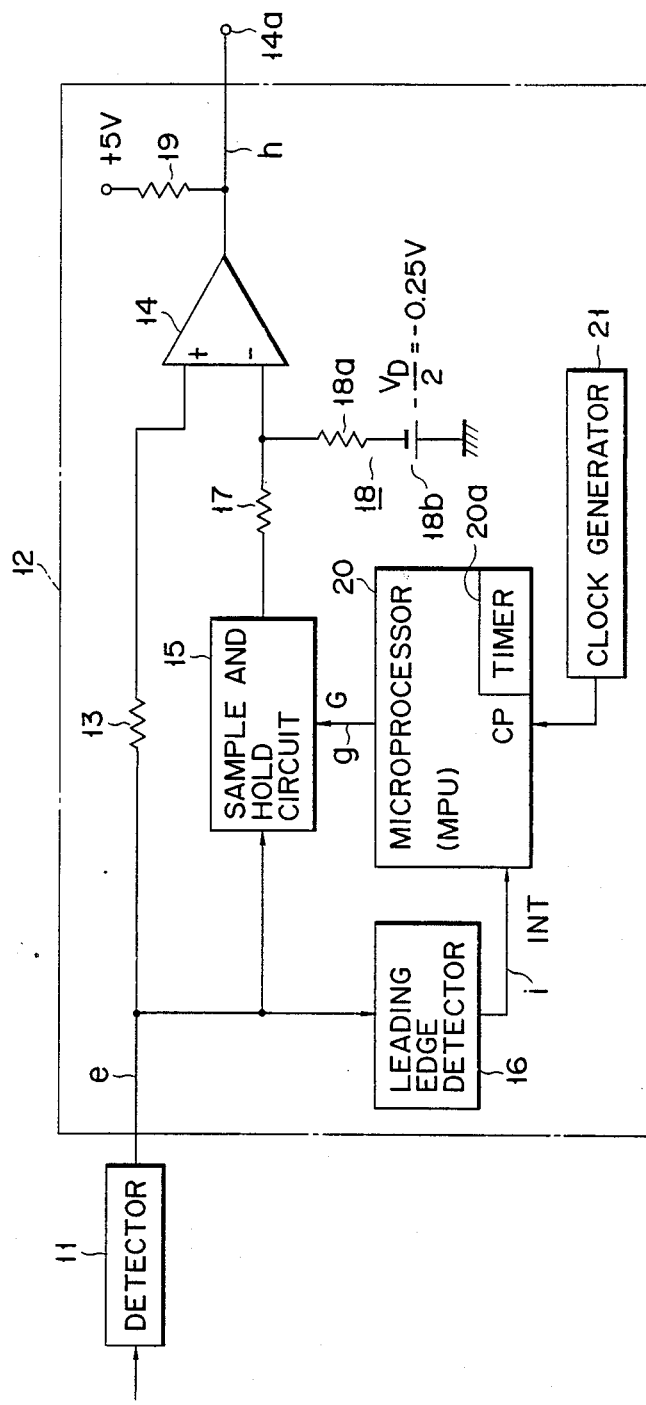
FIG. 6 is a block diagram showing an embodiment of an FSK demodulating device according to the present invention.

FIG. 6 is a block diagram showing an embodiment of an FSK demodulating device according to the present invention. The same reference numerals in FIG. 6 denote the same parts as in FIG. 1. More specifically, a frequency shift keying (FSK) signal received by receiver 7 through antenna 6 is converted into voltage signal e by detector 11, and voltage signal e is input to discriminator 12. Voltage signal e input to discriminator 12 is input to a (+) input terminal of voltage comparator 14 through resistor 13, and also input to sample and hold circuit 15 and leading edge detector 16. Voltage Vho held by and output from sample and hold circuit 15 is input to a (−) input terminal of voltage comparator 14 through resistor 17. Reference voltage VD/2 which is ½ amplitude value VD (=VH−VL) of voltage signal e is reverse-biased to the (−) input terminal from reference voltage circuit 18 (−VD/2=−0.25 V). Reference voltage circuit 18 includes resistor 18a and battery 18b having polarities shown in FIG. 6. More specifically, comparison voltage VR (Vho−VD/2) obtained by subtracting reference voltage (VD/2) of reference voltage circuit 18 from voltage Vho of sample and hold circuit 15 is input to the (−) input terminal of voltage comparator 14. A control voltage of +5 V is applied to output terminal 14a of comparator 14 through pull-up resistor 19.

As shown in FIG. 9A, the above leading edge detector 16 is a circuit for detecting the change in voltage signal e in a voltage increase direction. When a leading edge of voltage signal e is detected, leading edge detection pulse i is input to interrupt terminal INT of microprocessor (MPU) 20. Microprocessor (to be referred to as an MPU) 20 incorporates various input/output ports and timer 20a. When leading edge detection pulse i is input to MPU 20, and a time interrupt signal for every ΔT is input to clock terminal CP from clock oscillator 21, interrupt operations are executed by MPU 20 in accordance with programs, as shown in FIGS. 7 and 8.

Figure 7:
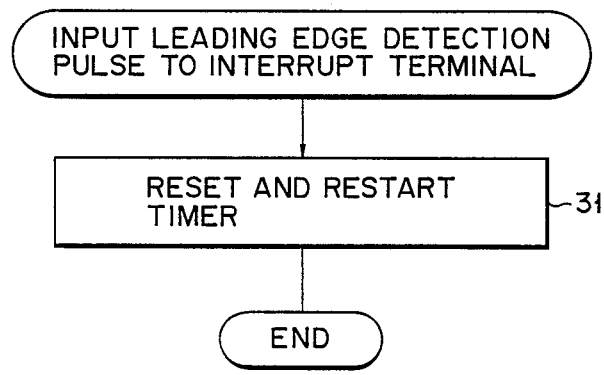
FIGS. 7 and 8 are flow charts showing processing executed by a microprocessor shown in FIG. 6.

More specifically, referring to FIG. 7, when leading edge detection pulse i is input to interrupt terminal INT, MPU 20 resets and restarts timer 20a, in step 31. Therefore, timer 20a reads pulse interval of leading edge detection pulse i, i.e., the duration of H level of voltage signal e.

Figure 8:
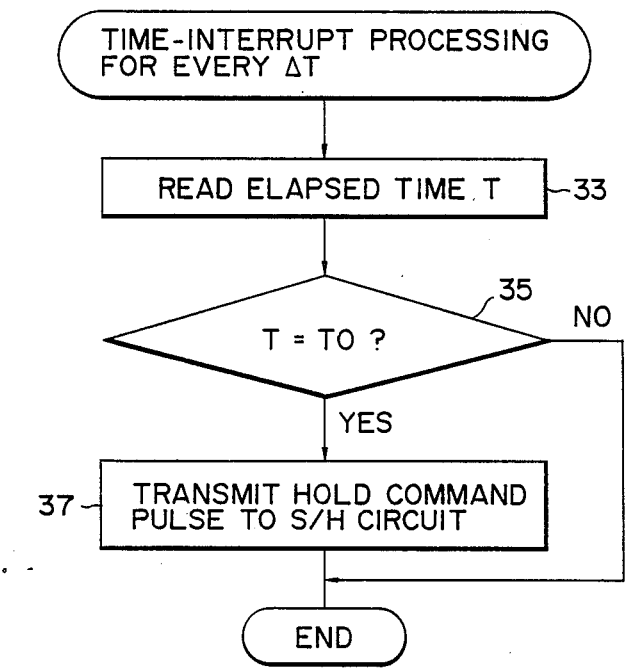

As shown in FIG. 8, when a time interrupt signal for every ΔT, e.g., which is set at a very short time of a few ms is input to clock terminal CP from clock oscillator 21, in step 33, time lapse T is counted by timer 20a. In step 35, it is determined that time lapse T does not reach predetermined time interval T0, MPU 20 ends this time-interrupt processing. If time lapse T reaches predetermined time interval T0, in step 37, hold command pulse g is input to control terminal G of sample and hold circuit 15.

Note that the predetermined time interval T0 is set to be slightly shorter than duration (several tens ms to a value between 100 and 200 ms) of "1" (H level) of preamble in the transmission frame including the preamble, the data, and the postamble, as shown in FIG. 9C.

When hold command pulse g shown in FIG. 9D is input to sample and hold circuit 15 from MPU 20, a signal value of voltage signal e at this time is output as holding voltage Vho.

An operation of the FSK demodulating device having the above arrangement will be described below with reference to timing charts in FIGS. 9A through 9H.

Voltage signal e output from detector 11 includes the transmission frame consisting of the preamble, the data, and the postamble, as described above. Assume that signal values (voltage values) at positions corresponding to H and L levels of this transmission frame are respectively represented by VH and VL, and that amplitude value (VH−VL) is represented by VD. Note that amplitude value VD is determined in accordance with a gradient of the voltage/frequency characteristic curve of voltage-controlled oscillator 3 at the transmitting side as described above, and is substantially constant. Amplitude value VD in this embodiment is set at 0.5 V.

When voltage signal e is enabled at the start position of the preamble at time t0, leading edge detection pulse i shown in FIG. 9B is output from leading edge detector 16, and timer 20a of MPU 20 starts to count time lapse T. When time lapse T shown in FIG. 9C reaches predetermined time interval T0, hold command pulse g shown in FIG. 9D is output from MPU 20. As shown in FIG. 9E, sample and hold circuit 15 outputs signal value VH as voltage Vho in the second half interval of the H-level preamble of voltage signal e.

As has been described above, since the reference voltage of −VD/2 shown in FIG. 9F is also applied to the (−) input terminal of voltage comparator 14, comparison voltage VR applied to this (−) input terminal is given as (VH−VD/2), as shown in FIG. 9G. Therefore, after this, voltage signal e is compared with comparison voltage VR. The comparison result is output from output terminal 14a as digital data signal h shown in FIG. 9H. Note that since a control voltage of 5 V is applied to output terminal 14a through pull-up resistor 19, the voltage value of digital data signal h of H level is set to be 5 V.

It should be noted that, since the signal value is often changed to be H or L level in a data interval of the transmission frame, timer 20 is reset before time lapse T counted by timer 20a reaches predetermined time interval T0. Therefore, hold command pulse g cannot be output during data reception.

According to the FSK demodulating device having the above arrangement, comparison voltage VR applied to the (−) input terminal of voltage comparator 14 has an intermediate voltage value, i.e., (VH−VD/2)=(VH−VL)/2, between signal values VH and VL respectively corresponding to H and L levels of voltage signal e. Therefore, even if voltage signal e is zero-point shifted and signal values VH and VL are largely shifted, signal values VH and VL are certainly discriminated in voltage comparator 14.

As a result, even if the voltage frequency characteristics of voltage-controlled oscillator 3 shown in FIG. 6 or digital data signal a transmitted from data processing circuit 2 is largely zero-point shifted, this FSK demodulating device can always demodulate frequency shift keying signal b to accurate digital data signal h.

What is claimed is:

1. A frequency shift keying (FSK) demodulating device in a transmission system for formatting digital data into a transmission frame including at least a preamble to transmit the data as a frequency shift keying signal, comprising:
   detecting means for detecting the input frequency shift keying signal (FSK signal) to convert the detected signal into a voltage signal corresponding to each of carrier frequency values; and
   discriminating means coupled to said detecting means for discriminating the voltage signal output from said detecting means to an original digital data signal representing said transmission frame, including:
   sampling and holding means coupled to said detecting means for holding a signal value of the voltage signal in response to a hold command signal;
   timer means coupled to said detecting means for counting a time lapse from a given change to a next change in a voltage increase direction;
   sample and hold controlling means coupled to said detecting means and said sampling and holding means, for supplying the hold command signal to said sampling and holding means when the time lapse counted by said timer means reaches a predetermined time interval determined in correspondence with a time lapse of significant level of the preamble in said transmission frame;
   reference voltage generating means coupled to said sampling and holding means, for generating a reference voltage which is a fraction of a predetermined value of an amplitude value of the voltage signal, and generating a difference voltage between the reference voltage and a voltage held by and output from said sampling and holding means as a comparison reference voltage signal; and comparing means coupled to said detecting means and said reference voltage generating means, for comparing the input voltage from said detecting means with the comparison reference voltage value output from said reference voltage generating means to detect the level of the voltage signal input from said detecting means.

2. A device according to claim 1, wherein said reference voltage generating means generates a reference voltage which is substantially ½ the voltage signal.

3. A device according to claim 1, wherein said sample and hold controlling means comprises a microprocessor.

4. A device according to claim 3, further comprising a leading edge detector, said leading edge detector interrupting said microprocessor which then resets said timer means when said leading edge detector detects a leading edge of the voltage signal output from said detecting means.

5. A device according to claim 1, wherein the predetermined time interval is set to be shorter than a duration of an H-level preamble in said transmission frame.

6. A frequency shift keying (FSK) signal demodulating device in the transmission system for formatting digital data into a transmission frame including at least a preamble to transmit the data as the frequency shift keying signal, comprising:

first detecting means for detecting the input frequency shift keying signal (FSK signal) to convert the detected signal into a voltage signal corresponding to each of carrier frequency values; and discriminating means coupled to said detecting means for discriminating the voltage signal output from said detecting means to the original digital data signal representing said transmission frame, including:

second detecting means coupled to said first detecting means for detecting a significant level of the voltage signal output from said detecting means;

reference voltage generating means for generating a voltage signal having an amplitude which is substantially ½ an amplitude of the signal detected by said second detecting means, as a comparison reference voltage signal; and comparing means coupled to said first detecting means and said reference voltage generating means, for comparing the comparison reference voltage signal output from said reference voltage generating means with the voltage signal output from said first detecting means to detect a level of the voltage signal input from said detecting means.

7. A frequency shift keying (FSK) signal demodulating device in a transmission system for formatting digital data into a transmission frame including at least a preamble to transmit the data as the frequency shift keying signal, comprising:

detecting means for detecting the input frequency shift keying signal (FSK signal) to convert the detected signal into a voltage signal corresponding to each of carrier frequency values; and discriminating means coupled to said detecting means for discriminating the voltage signal output from said detecting means to the original digital data signal representing said transmission frame, including:

reference voltage generating means for supplying a signal value of one level of the preamble included in said transmission frame as a comparison reference voltage signal; and comparing means coupled to said detecting means and said reference voltage generating means, one input terminal of which receives the voltage signal detected by said detecting means and the other input terminal of which receives the comparison reference voltage signal output from said reference voltage generating means, said comparing means detecting a level of the voltage signal input from said detecting means.

* * * * *